United States Patent
Nguyen et al.

(10) Patent No.: US 9,599,240 B2
(45) Date of Patent: Mar. 21, 2017

(54) POLYMER BELLOWS SPRING

(71) Applicants: Hy B. Nguyen, Upland, CA (US);
Thuan An Dinh, Tustin, CA (US);
Carlos E. Arellano, Garden Grove, CA (US)

(72) Inventors: Hy B. Nguyen, Upland, CA (US);
Thuan An Dinh, Tustin, CA (US);
Carlos E. Arellano, Garden Grove, CA (US)

(73) Assignee: SAINT-GOBAIN PERFORMANCE PLASTICS CORPORATION, Solon, OH (US)

(*) Notice: Subject to any disclaimer, the term of this patent is extended or adjusted under 35 U.S.C. 154(b) by 89 days.

(21) Appl. No.: 13/926,569

(22) Filed: Jun. 25, 2013

(65) Prior Publication Data
US 2014/0000730 A1 Jan. 2, 2014

Related U.S. Application Data

(60) Provisional application No. 61/665,630, filed on Jun. 28, 2012.

(51) Int. Cl.
*F16K 15/02* (2006.01)
*F16F 1/373* (2006.01)

(52) U.S. Cl.
CPC .......... *F16K 15/025* (2013.01); *F16F 1/3732* (2013.01); *F16K 15/021* (2013.01); *F16K 15/028* (2013.01); *Y10T 137/7837* (2015.04)

(58) Field of Classification Search
CPC .... F16K 17/145; F16K 17/087; F16K 31/126; F16K 15/021; F16K 1/3732; Y10T 137/7904; Y10T 137/7837; Y10T 137/7922
(Continued)

(56) References Cited

U.S. PATENT DOCUMENTS 4,183,372 A 1/1980 Ueda et al.
4,629,641 A 12/1986 Paullin
(Continued)

FOREIGN PATENT DOCUMENTS

CN 2072178 U 2/1991
CN 1136149 A 11/1996
(Continued)

OTHER PUBLICATIONS

The International Search Report and the Written Opinion for International Application No. PCT/US2013/047621 received from the International Searching Authority (ISA/KR), dated Aug. 23, 2013, 11 pages.
(Continued)

*Primary Examiner* — Kevin Lee
*Assistant Examiner* — P. MacAde Nichols
(74) *Attorney, Agent, or Firm* — Abel Law Group, LLP; Chi Suk Kim (57) ABSTRACT

A spring for use in a check valve is formed from a single piece of a polymeric material and includes a proximal end, a distal end, and a body positioned between the proximal end and the distal end. The body includes a wall, a proximal opening on the wall and a distal opening on the wall, and a bellows between the proximal opening and the distal opening. Further included is a process of forming the spring.

19 Claims, 2 Drawing Sheets

(58) Field of Classification Search
USPC ......... 137/540, 543.17, 543.19, 543.21, 852, 137/843, 903; 251/902; 604/99.02, 920
See application file for complete search history.

(56) References Cited

U.S. PATENT DOCUMENTS

| | | | |
|---|---|---|---|
| 4,958,860 A * | 9/1990 | Akitsu | F16L 27/012 285/114 |
| 5,743,292 A | 4/1998 | Robinson | |
| 5,848,605 A | 12/1998 | Bailey et al. | |
| 6,024,345 A | 2/2000 | Nishio | |
| 6,182,755 B1 | 2/2001 | Mansure | |
| 7,284,568 B2 | 10/2007 | Abe | |
| 7,762,278 B2 | 7/2010 | Adams et al. | |
| 2005/0151107 A1 | 7/2005 | Shu | |
| 2005/0217731 A1 | 10/2005 | Abe | |
| 2006/0037906 A1 | 2/2006 | Assion | |
| 2007/0251588 A1* | 11/2007 | Linder et al. | 137/625.5 |
| 2008/0169227 A1 | 7/2008 | Assion | |
| 2008/0203346 A1 | 8/2008 | Shu | |
| 2009/0217988 A1 | 9/2009 | Maxwell | |
| 2010/0099009 A1 | 4/2010 | Adams et al. | |
| 2010/0174242 A1* | 7/2010 | Anderson et al. | 604/246 |
| 2010/0178184 A1* | 7/2010 | Simmons | F04B 9/135 417/472 |
| 2011/0282302 A1 | 11/2011 | Lopez et al. | |

FOREIGN PATENT DOCUMENTS

| | | |
|---|---|---|
| CN | 101225924 A | 7/2008 |
| EP | 0833073 A2 | 4/1998 |
| EP | 0833073 B1 | 5/2003 |
| EP | 1582787 A2 | 10/2005 |
| EP | 1582787 A3 | 12/2005 |
| EP | 1582787 B1 | 5/2007 |
| EP | 1815070 B1 | 5/2012 |
| JP | S58002467 U | 1/1983 |
| JP | 63-039498 | 10/1988 |
| JP | S63152972 U | 10/1988 |
| JP | H05312273 A | 11/1993 |
| JP | H0630560 U | 4/1994 |
| JP | H11182432 A | 7/1999 |
| JP | 2000257564 A | 9/2000 |
| JP | 2000320591 A | 11/2000 |
| JP | 2001248741 A | 9/2001 |
| JP | 2003127014 A | 5/2003 |
| JP | 2003322264 A1 | 11/2003 |
| JP | 2008519405 A | 6/2008 |
| JP | 2008522729 A | 7/2008 |
| JP | 2011153684 A | 8/2011 |
| WO | 2006050261 A2 | 5/2006 |
| WO | 2006078355 A1 | 7/2006 |
| WO | 2008115494 A1 | 9/2008 |
| WO | 2009/157567 A1 | 12/2009 |
| WO | 2010/117484 A1 | 10/2010 |

OTHER PUBLICATIONS www.parker.com/partek; CV-32 Check Valve (2 inch), Bulk Chemical PTFE Check Value, Chemical Back Flow Protection for PFA Piping Systems, Parker Veriflo, LitPN: CV-32; Rev: A; Date of Issue Aug. 2011, 2 pages.

\* cited by examiner

POLYMER BELLOWS SPRING

CROSS-REFERENCE TO RELATED APPLICATION(S)

This application claims priority under 35 U.S.C. §119(e) to U.S. Patent Application No. 61/665,630 entitled "POLYMER BELLOWS SPRING," by Hy B. Nguyen, Thuan An Dinh, and Carlos E. Arellano, filed Jun. 28, 2012, which is assigned to the current assignee hereof and incorporated herein by reference in its entirety.

FIELD OF THE DISCLOSURE

The present disclosure relates to check valves and, more particularly, to a polymeric bellows spring for use with a check valve and to processes of forming the spring.

BACKGROUND

Check valves used in chemical delivery process applications, such as semiconductor fabrication processes, can not include any metal components because of the risk that the chemicals used in the process may interact unfavorably with the metal component. Therefore, check valves that include polymeric components are desired. Conventional polymer springs disposed within these check valves are inconsistent, however, exhibiting leakage of the chemicals through the check valve, failure to properly seal the check valve, misalignment of the components within the check valve, and a low flow coefficient.

Accordingly, there is a need for an improved spring for use with check valves.

SUMMARY

In an embodiment, a spring for use in a check valve is provided, wherein the spring is formed from a single piece of a polymeric material and wherein the spring includes a proximal end, a distal end positioned opposite to the proximal end, and a body positioned between the proximal end and the distal end, wherein the body includes a wall, wherein the body includes a proximal opening on a portion of the wall adjacent to the proximal end and a distal opening on a portion of the wall adjacent to the distal end, and wherein the body further includes a bellows between the proximal opening and the distal opening.

In another embodiment, a check valve is provided wherein the check valve includes a housing and a spring formed from a single piece of a polymeric material, wherein the spring includes a proximal end; a distal end positioned opposite to the proximal end; and a body positioned between the proximal end and the distal end, wherein the body includes a wall, wherein the body includes a proximal opening on a portion of the wall adjacent to the proximal end and a distal opening on a portion of the wall adjacent to the distal end, and wherein the body further includes a bellows between the proximal opening and the distal opening.

In yet another embodiment, a process for forming a spring for use in a check valve is provided, including providing a polymeric material and forming the polymeric material into the spring, wherein the spring includes a proximal end, a distal end positioned opposite to the proximal end, and a body positioned between the proximal end and the distal end, wherein the body includes a wall, wherein the body includes a proximal opening on a portion of the wall adjacent to the proximal end and a distal opening on a portion of the wall adjacent to the distal end, and wherein the body further includes a bellows between the proximal opening and the distal opening.

BRIEF DESCRIPTION OF THE DRAWINGS

Embodiments are illustrated by way of example and are not limited in the accompanying figures.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be used in this application.

Before addressing details of the embodiments described below, some terms are defined or clarified. The term "averaged" is intended to mean an average (i.e., an arithmetic mean), a median, or a geometric mean.

As used herein, the terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in reference books and other sources within the structural arts and corresponding manufacturing arts.

The present invention provides a spring for use in a check valve. A check valve is a type of valve that allows fluid to flow in a desired direction and prevents fluid from flowing in a direction opposite to the desired direction, or the reverse direction. A spring in accordance with the present invention is used in the check valve to allow fluid to flow in the desired direction through the check valve and to prevent fluid from flowing in the reverse direction. The spring includes any reasonable dimensions. In an embodiment, the spring has a height of between about 2 inches and about 5 inches, including a height of between about 3 inches and between about 4 inches. The spring includes a diameter of between about 1 inch and about 5 inches, including a diameter of between about 1.5 inches and about 4 inches, or a diameter between about 2 inches and about 3.5 inches.

In a particular embodiment, the spring is formed from a single piece of any reasonable polymeric material. In an exemplary embodiment, the polymeric material includes a fluoropolymer. Any reasonable fluoropolymer is envisioned. An exemplary fluoropolymer includes a homopolymer, copolymer, terpolymer, or polymer blend formed from a monomer, such as tetrafluoroethylene, hexafluoropropylene, chlorotrifluoroethylene, trifluoroethylene, vinylidene fluoride, vinyl fluoride, perfluoropropyl vinyl ether, perfluoromethyl vinyl ether, or any combination thereof.

The fluoropolymers may include polymers, polymer blends and copolymers including one or more of the above monomers, such as fluorinated ethylene propylene (FEP), ethylene-tetrafluoroethylene (ETFE), poly tetrafluoroethylene-perfluoropropylether (PFA), poly tetrafluoroethylene-perfluoromethylvinylether (MFA), poly tetrafluoroethylene (PTFE), poly vinylidene fluoride (PVDF), ethylene chlorotrifluoroethylene (ECTFE), poly chloro-trifluoroethylene (PCTFE), and tetrafluoroethylene-hexafluoropropylene-vinylidene fluoride (THV).

In an embodiment, the fluoropolymer can include polytetrafluoroethylene (PTFE). In a particular embodiment, the polymeric material can include a high purity fluoropolymer. In another embodiment, the polymeric material can include a 100% high purity PTFE. For example, the polymeric material can include PTFE that is substantially free of any additives. "Substantially free" as used herein refers to less than about 1.0 wt. %, such as less than about 0.5 wt. %, or even less than about 0.1 wt. % of additives based on the total weight of the polymeric material. The polymeric material can appear visibly to be of a high purity, without spots, discolorations or similar defects. It is also desirable to select the polymeric material such that it is resistant to the corrosive effect of any chemicals which will come into contact with the spring. Such chemicals can include, for example, hydrogen fluoride, hydrogen chloride, and a variety of abrasive slurries. It is further desirable to select the polymeric material such that it will operate properly under specific conditions without degradation of the polymeric material. Such conditions can include a temperature range between about 0° C. and about 100° C. and a range of gauge pressures, or pressures relative to the local atmospheric or ambient pressure, up to about 90 psig. It is also desirable to select the polymeric material such that it will satisfy any current standards for the industries in which the spring will be used, including but not limited to Semi F57, the provisional specification for polymer components used in ultrapure water and liquid chemical distribution systems.

The spring includes a proximal end and a distal end positioned opposite to the proximal end. Each of the proximal end and the distal end can include any reasonable dimensions, including a diameter of between about 2 inches and about 3.5 inches. Each of the proximal end and the distal end can also include a cross-section of any reasonable shape. For example, the cross-section of each of the proximal end and the distal end includes a circular shape. The spring further includes a body positioned between the proximal end and the distal end, where the body includes a wall. The wall may include any reasonable average thickness, including a range of thicknesses between about 0.01 inches and about 0.02 inches, such as between about 0.011 and about 0.019 inches, such as between about 0.012 and about 0.018 inches, or even between about 0.013 and 0.017 inches. In an embodiment, the wall includes an average thickness of between about 0.015 inches and about 0.018 inches.

The body of the spring includes at least one proximal opening on a portion of the wall adjacent to the proximal end and at least one distal opening on a portion of the wall adjacent to the distal end. The proximal and distal openings include any reasonable opening on the wall, including a hole, slot, port, slit, or any combination thereof. Each of the proximal and distal openings includes any reasonable configuration, such as circular, oval, rectangular, square, quadrilateral, or any combination thereof. Each of the proximal and distal openings also includes any reasonable dimensions. In an embodiment, each of the proximal and distal openings includes a height of between about 0.2 inches and about 0.5 inches. For example, each of the proximal and distal openings includes a height of between about 0.3 and 0.4 inches. Any length of the proximal and the distal openings may be envisioned with the proviso that the mechanical integrity of the spring is maintained.

The body includes any reasonable number of proximal and distal openings. In an embodiment, there are multiple proximal openings on a portion of the wall adjacent to the proximal end. For example, the multiple proximal openings circumnavigate the portion of the wall adjacent to the proximal end or may include any other reasonable orientation relative to each other. In another embodiment, there are multiple distal openings on a portion of the wall adjacent to the distal end, the multiple distal openings including any reasonable orientation relative to each other. In yet another embodiment, there are multiple openings on the portions of the wall adjacent to both ends of the spring, such that there is more than one opening on a portion of the wall adjacent to each of the proximal and distal ends. Where there are multiple openings, each of the openings can include the same shape, size, or orientation relative to another opening or each of the openings can vary in shape, size, and orientation relative to another opening. The openings can be balanced such that there are an equal number of openings adjacent to either end of the spring, or the openings can be unbalanced such that there are an unequal number of openings adjacent to either end of the spring.

In an embodiment, the spring can also include a lumen. The lumen is within the body of the spring. The lumen includes any reasonable cross-section, such as a circular cross-section, and any reasonable diameter, such as a diameter of between about 1.5 inches and about 4 inches. For example, the lumen includes a diameter of between about 2 inches and about 3 inches. The lumen can extend continuously through the body and, in an embodiment, can extend through the distal end of the spring to allow fluid flow therethrough. In an embodiment, the lumen does not extend through the proximal end of the spring. In yet another embodiment, the lumen does not extend through either the proximal or the distal end of the spring.

In an embodiment, the proximal opening or the distal opening, or both, can provide fluid communication to the lumen. In a particular embodiment, a fluid may enter the spring by flowing through the exterior of the spring into the proximal opening, through the lumen, and may exit the spring by flowing out of the distal opening. In another embodiment, a fluid may enter the spring by flowing through the exterior of the spring into the distal opening, through the lumen, and may exit the spring by flowing out of the proximal opening. In a further embodiment, fluid may enter or exit the spring by flowing through both of the proximal and distal openings to or from the lumen. If the lumen also extends through the distal end, then the proximal or distal openings, or both, can facilitate fluid communication through the lumen and the distal end.

The body further includes a bellows between the proximal opening and the distal opening. The bellows can include any reasonable configuration, such as a coil-like configuration with concentric rings or an accordion-like configuration with folds, which allows the bellows to deform in response to a change in an environmental condition. For example, the bellows can compress from an initial position when exposed to an increase in pressure or force or similar condition, such as an increase in fluid pressure, and the bellows can also expand or return to the initial position when exposed to a decrease in that condition. While the bellows is deformed, neither the ends of the spring nor the openings on the wall may be similarly deformed. The portion of the wall that helps to define the bellows includes the same average thickness as or a different average thickness from other portions of the wall.

One advantage to providing a polymeric spring with a single piece construction and openings incorporated into the structure of the spring on either side of a bellows is a higher level of repeatability. That is, a check valve that includes a spring as described above exhibits better performance, in terms of improved sealing and decreased leaking, over a longer period of time. In an embodiment, a check valve in accordance with the present invention includes an expected life of about 250,000 cycles.

The spring can include any reasonable mechanism to facilitate desired fluid flow and to prevent unwanted fluid flow through a check valve. For example, the spring can include a sealing lip or other protrusion or surface on the proximal end of the spring. The sealing lip includes any reasonable shape, such as a circular shape that circumnavigates the proximal end. The sealing lip can include any reasonable dimensions, such as a diameter of between about 2 inches and about 3 inches. The sealing lip can protrude from the proximal end to engage or disengage with a housing of the check valve, and such a protrusion can include any reasonable height, including a height of between about 0.1 inches and about 0.2 inches. In an embodiment, the proximal end and the sealing lip are positioned closer to an inlet of a housing of the check valve than to an outlet of the housing to facilitate fluid flow in a desired direction and to prevent fluid flow in a reverse direction.

The sealing lip is configured to engage and disengage with a housing of the check valve. For example, the sealing lip can disengage with the housing when the bellows of the spring are compressed. In an embodiment, at least a portion of the sealing lip is in contact with a proximal interior surface of the housing, which can include a surface that circumnavigates an inlet of the housing. In a particular embodiment, the proximal interior surface can include a proximal interior sealing surface of the housing. When there is an absence of fluid within the inlet or when there is an insufficient pressure on the proximal end due to fluid flow through the inlet to overcome the cracking pressure of the check valve, the spring maintains an initial position in which the bellows are expanded and the sealing lip contacts the proximal interior sealing surface of the housing. This initial position prevents fluid flow in either direction through the check valve. When the proximal end is exposed to a sufficient pressure equal to or greater than the cracking pressure of the check valve, for example by a fluid entering the inlet and pressing against the proximal end, the bellows of the spring compress, disengaging the sealing lip from the proximal interior sealing surface and moving the proximal end toward the distal end of the spring. Such movement permits fluid to flow through the check valve by flowing through the proximal opening and, in an embodiment, also through the distal opening. In a particular embodiment, the fluid can also flow around the proximal end. In another particular embodiment, the fluid can also flow through a lumen in the spring that can extend through the distal end of the spring and through an outlet of the housing.

The sealing lip can also engage with the housing. For example, the sealing lip can contact the proximal interior sealing surface of the housing when the bellows of the spring expand. In an embodiment, fluid can enter the outlet, representing fluid flow in a reverse direction. In a particular embodiment, the fluid can enter the spring through the distal end of the spring if a lumen extends through the distal end. Pressure due to fluid flow in the reverse direction causes the bellows of the spring to expand, moving the proximal end of the spring toward the proximal interior sealing surface of the housing again. Such movement positions the sealing lip in contact with the proximal interior sealing surface of the housing and prevents fluid from flowing through the check valve in a reverse direction by effectively sealing the inlet off and preventing the fluid from flowing beyond the proximal end into the inlet.

One advantage to a sealing lip as described above is that the sealing lip is less likely to become misaligned with the proximal interior sealing surface of the housing. For instance, the sealing lip may be integral with the spring in contrast to conventional check valve designs that include sealing disks coupled to a spring by means of a baffle. Misalignment of a sealing surface within a check valve, as is seen with conventional check valve designs, leads to fluid leaks from the check valve, a lack of a proper seal by the spring, and a lowered flow coefficient. Another advantage to the integral sealing lip as described is that it is part of a single piece design for the spring, which reduces the number of moving parts and similarly lowers the risk that a sealing surface will become misaligned within the check valve.

The spring can also include any reasonable mechanism to stabilize the spring within a housing of a check valve. For example, the spring can include a guide at the distal end of the spring. The guide can include any reasonable configuration, such as a notch, a step, a lock, a tab, a clip, a brace, or any combination thereof. In an example, the guide maintains the spring within proper orientation to the housing. In an embodiment, the guide can include a tab of any reasonable thickness that circumnavigates the distal end. For example, the guide can include a tab with an average thickness of between about 0.1 inches and about 0.4 inches, such as between about 0.2 inches and about 0.3 inches. The guide can also include any reasonable diameter, including a diameter of between about 2 inches and about 3 inches, such as a diameter between about 2.5 inches and about 3.5 inches. In a particular embodiment, the diameter of the guide can be greater than the diameter of the sealing lip. For example, the guide can include a diameter that is between about 0.5 inches to about 1 inch, such as a diameter between about 0.15 and about 0.3 inches, greater than the diameter of the sealing lip.

The guide can stabilize the spring within the housing using any reasonable means. For example, the guide can contact a distal interior surface of the housing. In an embodiment, the guide contacts, or fits against, a first distal interior surface of the housing that circumnavigates an outlet of the housing. In a particular embodiment, the guide also contacts or fits against a second distal interior surface that circumnavigates an interior chamber of the housing into which the spring is placed. By fitting against one or both of the distal interior surfaces, the guide enables the spring to remain stabilized while the bellows compress or expand and while fluid flows through the check valve. For example, as the bellows of the spring compress, the distal end of the spring is held steady against one or both distal interior surfaces with frictional force to permit fluid to flow through an inlet of the housing, the proximal and distal openings of the spring and, in some embodiments, through a lumen of the spring and through the distal end. As the bellows of the spring expand, the distal end of the spring is held against one or both distal interior surfaces while the sealing lip contacts a proximal interior sealing surface of the housing that circumnavigates the inlet. An advantage to the guide as described is that the spring, and relatedly, the sealing lip, is less likely to become misaligned within the housing, which decreases the risk of a fluid leak from the check valve and the risk of the check valve not being properly sealed, and increases the flow efficiency of the check valve. Another advantage is that the guide, as an integral feature of the spring, does not require any additional mechanical or chemical coupling with the housing to properly stabilize the spring.

The present invention also provides a check valve that includes a housing and a spring, formed from a single piece of a polymeric material as described above, contained within the housing. The check valve includes any reasonable size, such as a size between about 1 inch and about 5 inches, such as a size between about 2 inches and about 4 inches, or such as a size between about 2.5 inches and about 3.5 inches. In an embodiment, the check valve includes a 2 inch check valve, which may be used in a variety of industries, including a semiconductor fabrication process industry. The check valve also includes any reasonable materials. For example, the housing, like the spring, includes a polymeric material, such as a fluoropolymer. In a particular embodiment, the housing includes a high purity fluoropolymer, including a high purity PTFE. The check valve may also include any other reasonable parameters. For example, the check valve may include a flow coefficient value, Cv, which measures the efficiency of the check valve in allowing a fluid to flow through the check valve. In an embodiment, the check valve may include a flow coefficient value of at least 35, such as at least 36, at least 37, at least 38, at least 40, or at least 42 or even at least 45. In a particular embodiment, the check valve may include a flow coefficient value of at least 40, such as a range of values between about 35 and about 40. The check valve may also include a cracking pressure parameter. For example, the check valve may include a cracking pressure value that measures the threshold gauge pressure at which fluid is permitted to flow through the check valve. In an embodiment, the check valve may include a cracking pressure range of between about 0.5 psig and about 1.0 psig, such as between about 0.5 psig and about 0.9 psig, or between about 0.5 psig and about 0.75 psig, or between about 0.6 psig and about 1.0 psig, or between about 0.75 psig and 1.0 psig.

The housing includes an inlet, such as a channel, a tube or a lumen, through which fluid can flow. In a particular embodiment, fluid enters the check valve by flowing through the inlet. The housing also includes an outlet, which can include the same or a different configuration as the inlet. In a particular embodiment, fluid exits the check valve by flowing through the outlet. The housing further includes an interior chamber positioned between the inlet and the outlet and the interior chamber may also include a channel, a tube, or a lumen. In an embodiment, the spring as described above is positioned within the interior chamber. In a particular embodiment, the diameter of the interior chamber may be less than the diameter of the inlet, the outlet, or both of the inlet and the outlet. In another embodiment, the diameter of the interior chamber may be greater than that of the inlet, the outlet, or both. A first distal interior surface can occur where the interior chamber and the outlet meet, such first distal interior surface being used to make contact with a guide of a spring as described above. The diameter of the interior chamber can define a second distal interior surface against which the guide of a spring may also fit as described above. A proximal interior surface, such as a proximal interior sealing surface, can also occur where the inlet and the interior chamber meet. This proximal interior sealing surface can be used to make contact with a sealing lip of a spring as described above.

Turning to a process for forming a spring for use in a check valve, a polymeric material may be provided for forming the spring. Any suitable polymeric material may be used, including a fluoropolymer such as PTFE, and in a particular embodiment, a high purity fluoropolymer may be used. The polymeric material may be chosen depending on the environmental conditions to which the spring will be exposed and the industrial standards that the spring must meet. In an embodiment, the spring will be formed from a single piece of the chosen polymeric material. In another embodiment, the spring will be formed from more than one piece of the chosen polymeric material to create a spring with the final features, such as the openings on the wall, as described above. The polymeric material may take any reasonable initial form. For example, the polymeric material may initially include a powder or other particulate form that is compression molded to prepare the material for forming.

The polymeric material is then formed into the spring using any reasonable approach. Forming the spring includes forming proximal and distal ends of the spring, a body with a wall between the proximal and distal ends, proximal and distal openings on the wall as described above, and a bellows. In some instances, forming the spring also includes forming a lumen within the body so that the proximal and distal openings can provide fluid communication to the lumen. In a particular embodiment, the lumen is formed to extend through the distal end. In another embodiment, the spring is formed to include a sealing lip and a guide as described above. The polymeric material may be formed by machining to create a spring in accordance with the present invention. Any reasonable machining is envisioned.

Figure 1:
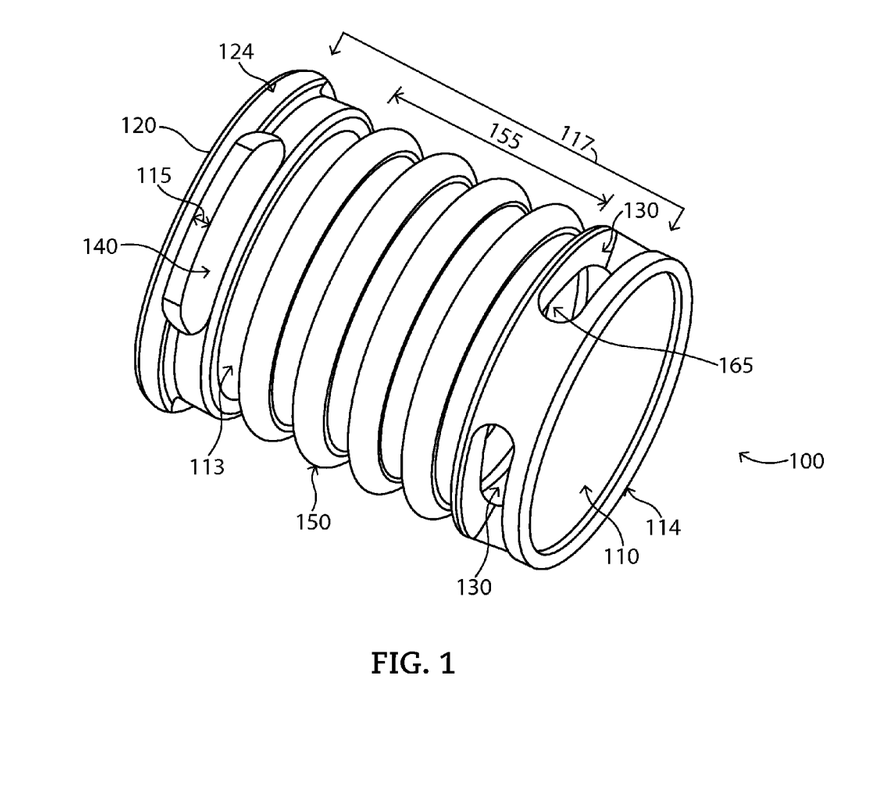
FIG. 1 includes an illustration of a spring in accordance with an embodiment described herein.

Turning to FIG. 1, an illustration of a spring is provided. Spring 100 includes any reasonable polymeric material, including a fluoropolymer such as a high purity PTFE. Spring 100 is formed from a single piece of the polymeric material. Spring 100 includes both a proximal end 110 and a distal end 120 opposite to proximal end 110. Spring 100 also includes a body 117 positioned between proximal end 110 and distal end 120. The body 117 includes a wall 113 of an average thickness 115 and formed from the polymeric material.

Body 117 includes a proximal opening 130 on a portion of wall 113 adjacent to proximal end 110. FIG. 1 shows two proximal openings 130 adjacent to proximal end 110, but it is understood that any number of proximal openings 130 can be included in the present invention. Although illustrated as oval, each of proximal openings 130 can include any reasonable shape, size, and orientation relative to another proximal opening 130. Body 117 also includes a distal opening 140 on a portion of wall 113 adjacent to distal end 120. FIG. 1 illustrates one distal opening 140 adjacent to distal end 120, but it is also understood that any number of distal openings 140 can be included in the present invention. In an embodiment, the number of proximal openings 130 equals the number of distal openings 140. In another embodiment, the number of proximal openings 130 does not equal the number of distal openings 140. Although illustrated as oval, each of distal openings 140 can include any reasonable shape, size, and orientation relative to another distal opening 140. Distal openings 140 may or may not resemble proximal openings 130.

Body 117 further includes bellows 150 between proximal opening 130 and distal opening 140. Bellows 150 can include any reasonable configuration, such as a coil-like configuration with concentric rings as depicted in FIG. 1 or an accordion-like configuration with folds. Bellows 150 is capable of deforming in response to a change in an environmental condition. For example, bellows 150 can compress from an initial position that includes an initial height 155, to a position with a height less than initial height 155, when exposed to an increase in pressure or force or similar condition, such as an increase in fluid pressure. When exposed to a decrease in that same condition or a different condition, bellows 150 can also expand or return to the initial position, such as initial height 155. While bellows 150 is deformed, proximal end 110, distal end 120, proximal opening 130, and distal opening 140 may not be similarly deformed. Similarly, while bellows 150 is compressed, bellows 150 may not deform in another dimensions. For example, bellows 150 does not increase or decrease in diameter when bellows 150 are deformed. The portion of wall 113 that helps to define bellows 150 can includes the same average thickness 115 as or a different average thickness 115 from other portions of wall 113.

Spring 100 can also include a lumen 165. In an embodiment, lumen 165 can be positioned within body 117 and can extend from proximal opening 130 to distal opening 140 so that proximal opening 130 and the distal opening 140 can provide fluid communication into or out of lumen 165. In an embodiment, lumen 165 extends through distal end 120.

Spring 100 also includes a sealing lip 114 as described above. Sealing lip 114 can circumnavigate proximal end 110. Sealing lip 114 can include any reasonable dimensions to enable it to contact a proximal interior sealing surface of a housing of a check valve to seal the check valve. Spring 100 also includes a guide 124 as described above. Guide 124 circumnavigates distal end 120. Although illustrated as a tab, guide 124 can include any reasonable dimensions to enable it to contact one or more distal interior surfaces of a housing of a check valve to stabilize spring 100.

Figure 2A:
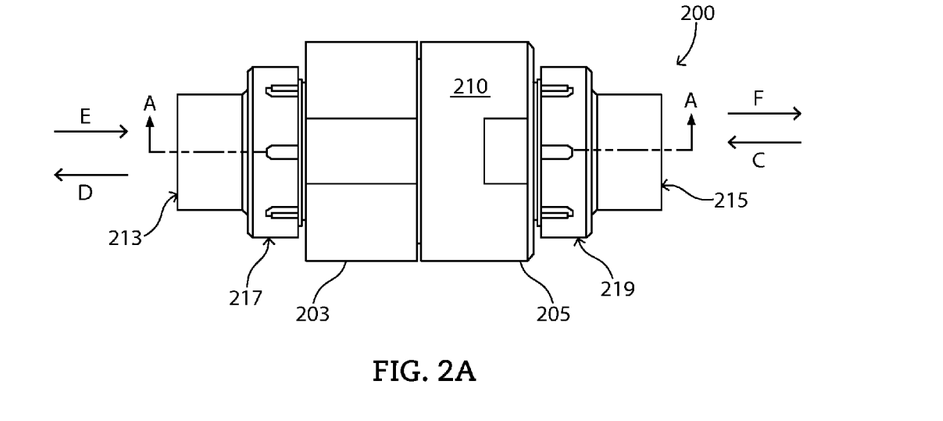
FIG. 2A includes an illustration of a check valve in accordance with an embodiment described herein.

Turning to FIG. 2A, an illustration of a check valve is provided. Check valve 200 includes any reasonable size of check valve. Check valve 200 includes a housing 210 that can include any reasonable polymeric material, including the same or a different polymeric material from which spring 100 is formed. In an embodiment, housing 210 can include more than one component that can be coupled together using any reasonable sealing means. For example, housing 210 can include male component 203 that engages female component 205 using any reasonable coupling means such as a tongue and groove design or using threading means. Housing 210 can be coupled to pipe 213 and pipe 215 using any reasonable means to facilitate fluid flow. For example, male component 203 can be coupled to pipe 213 using threaded collar 217 and female component 205 can be coupled to pipe 215 using threaded collar 219. Housing 210 is coupled to pipes 213 and 215 to enable a direction of fluid flow from pipe 215, through housing 210, and toward pipe 213. This direction of fluid flow can be parallel to depicted directions C and D and may be the desired direction of flow for check valve 200. Because check valve 200 is equipped to prevent fluid flow in a reverse direction, check valve 200 may, for example, be equipped to prevent fluid from flowing through housing 210 by entering pipe 213 and exiting pipe 215. The reverse direction of flow can be parallel to depicted directions E and F. Check valve 200 can use any reasonable means to prevent fluid from flowing in a direction parallel to directions E and F, including spring 100.

Figure 2B:
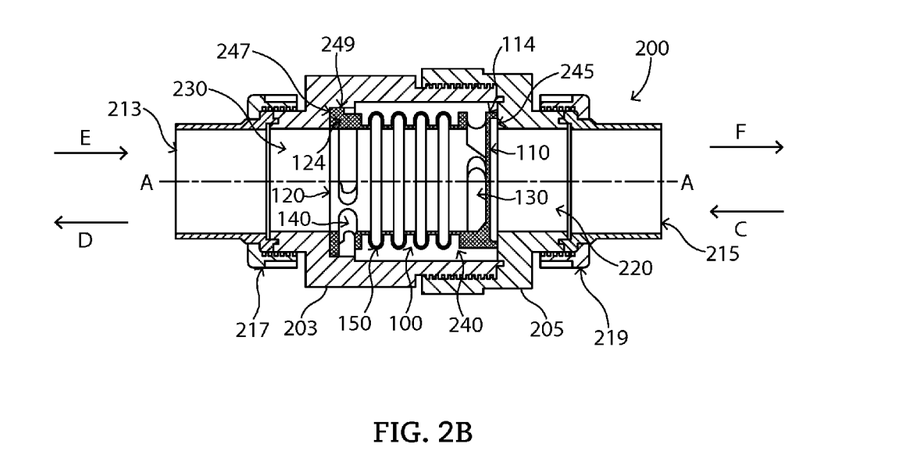
FIG. 2B includes an illustration of a cross-sectional view of the check valve of FIG. 2A seen from line A-A in accordance with an embodiment described herein.

Turning to FIG. 2B, an illustration of a cross-sectional view of check valve 200 seen from line A-A is provided. Check valve 200 includes spring 100 within an interior chamber 240 of housing 210. Spring 100, as shown, is oriented such that proximal end 110 is closer to an inlet 220 of housing 210 while distal end 120 is closer to an outlet 230 of housing 210. Such an orientation facilitates a desired direction of fluid flow for check valve 200 such that fluid enters inlet 220 via pipe 215 that is coupled to female component 205 using threaded collar 219, flows through housing 210, and exits outlet 230 toward pipe 213 that is coupled to male component 203 using threaded collar 217.

Housing 210 includes a proximal interior sealing surface 245 where interior chamber 240 and inlet 220 meet. Proximal interior sealing surface 245 can include a surface that circumnavigates inlet 220. Sealing lip 114 contacts at least a portion of proximal interior sealing surface 245 to provide a seal for check valve 200. Housing 210 includes a first distal interior surface 247 where interior chamber 240 and outlet 230 meet. First distal interior surface 247 can include a surface that circumnavigates outlet 230. Housing 210 also includes a second distal interior surface 249, which can circumnavigate interior chamber 240. Guide 124 contacts at least a portion of either first distal interior surface 247 or second distal interior surface 249, or both, to stabilize spring 100 within housing 210. For example, spring 100 is oriented within housing 210 such that the longitudinal axis of spring 100 is parallel to the longitudinal axis of housing 210 and check valve 200. Such an orientation of spring 100 maximizes flow through check valve 200 and minimizes the risk of fluid leakage from check valve 200. If the orientation of spring 100 were to change such that the longitudinal axis of spring 100 was not parallel to (e.g., was at a non-zero angle relative to) the longitudinal axis of housing 210, for example in response to fluid flow or other disruption to check valve 200, then the altered orientation of spring 100 could increase the risk of fluid leakage from check valve 200 and lower the flow coefficient of check valve 200. Guide 124, then, provides stabilization to spring 100 within housing 210 by fitting against one or both of distal interior surfaces 247 and 249 to minimize the risk that spring 100 will become misaligned within housing 210.

Check valve 200 may permit fluid to flow in a desired direction, such as a direction parallel to directions C and D, using spring 100. In an embodiment, fluid may enter housing 210 through inlet 220 via pipe 215. The fluid exerts a pressure against proximal end 110. If the pressure does not exceed a cracking pressure of check valve 200, such as a cracking pressure range of about 0.5 psig to about 1.0 psig, then proximal end 110 does not move and sealing lip 114 maintains a sealing contact with proximal interior sealing surface 245. If the pressure exceeds the cracking pressure, then proximal end 110 and sealing lip 114 move toward distal end 120, the movement enabled by a deformation (e.g., a compression) of bellows 150 in response to the pressure. The fluid flows through at least one of proximal openings 130 and may also flow through at least one of distal openings 140. Spring 100 can include a lumen 165 that extends through distal end 120 and to which proximal openings 130 and distal openings 140 provide fluid communication. The fluid flows through lumen 165 and may exit spring 100 through distal end 120. Distal end 120 does not move in response to the fluid flow or the movement of bellows 150 because guide 124 stabilizes distal end 120 within housing 210. The stability of spring 100 enables check valve 200 to exhibit a higher flow coefficient, such as a flow coefficient of at least 35, and to minimize the risk that spring 100 will become misaligned within housing 210, which can lead to an increased risk of fluid leakage from check valve 200. The fluid exits housing 210 through outlet 230 toward pipe 213. When the pressure exerted by the fluid drops below the cracking pressure, bellows 150 moves proximal end 110 and sealing lip 114 toward proximal interior sealing surface 245 to seal check valve 200. For example, bellows 150 expands back to an initial position, such as an initial height 155, which puts sealing face 114 in contact with proximal interior sealing surface 245.

Check valve 200 may prevent fluid from flowing in a reverse direction, such as a direction parallel to directions E and F, using spring 100. In an embodiment, fluid may enter housing 210 through outlet 230 via pipe 213 and may flow into spring 100. For example, the fluid can flow into spring 100 through lumen 165 that extends through distal end 120. The fluid is prevented from flowing beyond proximal end 110, however, because bellow 150 is expanded to place sealing lip 114 in contact with proximal interior sealing surface 245 to seal inlet 220 off from interior chamber 240. Barred from flowing beyond proximal end 110, the fluid also does not flow through inlet 220 to pipe 215 and check valve 200 does not permit fluid flow in a reverse direction.

Certain features, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A spring for use in a check valve, wherein the spring is formed from a single piece of a polymeric material and wherein the spring comprises:
   a proximal end;
   a distal end positioned opposite to the proximal end; and
   a body positioned between the proximal end and the distal end, wherein the body comprises a wall, wherein the body comprises a proximal opening on a portion of the wall adjacent to the proximal end and a distal opening on a portion of the wall adjacent to the distal end, wherein the body further comprises a bellows between the proximal opening and the distal opening, and wherein the bellows is spaced apart from the proximal end and the distal end.

2. The spring of claim 1, wherein the polymeric material is a fluoropolymer.

3. The spring of claim 2, wherein the polymeric material is polytetrafluoroethylene (PTFE).

4. The spring of claim 1, wherein the spring further comprises a lumen within the body and wherein the proximal opening and the distal opening provide fluid communication to the lumen.

5. The spring of claim 1, wherein the wall has an average thickness of between about 0.01 inches and about 0.02 inches.

6. The spring of claim 1, wherein the spring comprises a sealing lip configured to engage and disengage with a housing of a check valve.

7. The spring of claim 1, wherein the spring comprises a guide to stabilize the spring in a housing of a check valve.

8. A check valve comprising:
   a housing; and
   a spring contained within the housing, wherein the spring is formed from a single piece of a polymeric material, wherein the spring comprises a proximal end; a distal end positioned opposite to the proximal end; and a body positioned between the proximal end and the distal end, wherein the body comprises a wall, wherein the body comprises a proximal opening on a portion of the wall adjacent to the proximal end and a distal opening on a portion of the wall adjacent to the distal end, wherein the body further comprises a bellows between the proximal opening and the distal opening, and wherein the bellows is spaced apart from the proximal end and the distal end.

9. The check valve of claim 8, wherein the check valve has a size of about 1 inch to about 5 inches.

10. The check valve of claim 8, wherein the check valve comprises a cracking pressure range between about 0.5 psig and about 1.0 psig.

11. The check valve of claim 8, wherein the polymeric material is a fluoropolymer.

12. The check valve of claim 11, wherein the polymeric material is polytetrafluoroethylene (PTFE).

13. The check valve of claim 8, wherein the spring further comprises a lumen within the body and wherein the proximal opening and the distal opening provide fluid communication to the lumen.

14. The check valve of claim 8, wherein the check valve comprises a flow coefficient value of at least 35.

15. A process for forming a spring for use in a check valve, comprising:
providing a polymeric material; and
forming the polymeric material into the spring, wherein the spring comprises
a proximal end;
a distal end positioned opposite to the proximal end; and
a body positioned between the proximal end and the distal end, wherein the body comprises a wall, wherein the body comprises a proximal opening on a portion of the wall adjacent to the proximal end and a distal opening on a portion of the wall adjacent to the distal end, wherein the body further comprises a bellows between the proximal opening and the distal opening, and wherein the bellows is spaced apart from the proximal end and the distal end.

16. The process of claim 15, wherein the polymeric material is a fluoropolymer.

17. The process of claim 15, wherein the spring further comprises a lumen within the body and wherein the proximal opening and the distal opening provide fluid communication to the lumen.

18. The process of claim 15, wherein forming the polymeric material includes machining the polymeric material.

19. The process of claim 15, wherein forming the polymeric material includes any forming options.

\* \* \* \* \*